Patented Jan. 2, 1951

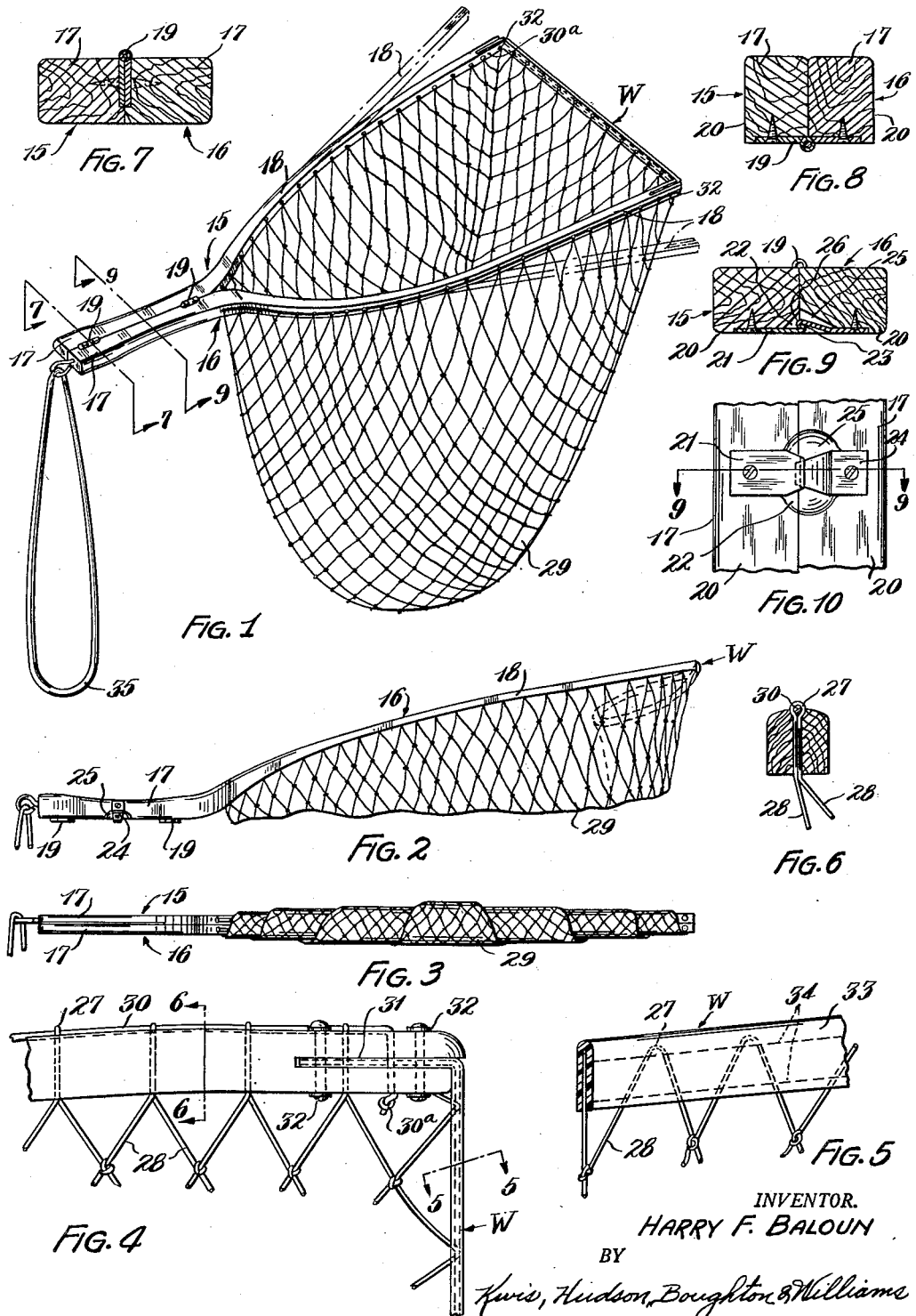

2,536,251

UNITED STATES PATENT OFFICE 2,536,251

COLLAPSIBLE FISHING NET

Harry F. Baloun, Cleveland, Ohio

Application November 15, 1947, Serial No. 786,307

7 Claims. (Cl. 43—12)

This invention relates to a landing net for use by fishermen, and more particularly to a collapsible or folding landing net.

The nets employed by fishermen to land a hooked fish from the water heretofore have been non-collapsible nets, or if collapsible they have been formed of two separate and detachable parts, namely, a net supporting frame portion and a separate detachable handle portion. The non-collapsible net has the disadvantages that it catches and tears on bushes and other obstructions when being carried from one point to another while fishing and it is not compact so as to be readily and conveniently stowed in the fisherman's luggage in a minimum amount of space. The collapsible nets heretofore used have had the disadvantage of being formed of two separable members or portions with the result that should the handle portion be lost or mislaid, as might readily happen, the net becomes substantially useless. Also the known collapsible nets present a measure of difficulty and effort in assembling together the two separable parts of the net.

Another object of the invention is to provide an improved and novel collapsible or folding landing net which is formed of permanently interconnected parts wherefore there is no possibility of any of the net parts being lost or misplaced.

Another object is to provide a collapsible or folding landing net which can be readily manipulated from collapsed or folded condition to open or operative condition and vice versa, thereby facilitating the use of the net particularly when the fisherman is moving through underbrush and the like from one fishing point to another and at which time it is desirable to have the net folded or collapsed to reduce to a minimum the likelihood of the net catching on twigs, branches and the like.

A further object is to provide a collapsible or folding landing net which is so constructed that the user can manipulate the net from folded to open condition and vice versa by means of one hand.

Another object of the invention is to provide a collapsible or folding landing net wherein the relatively movable frame portions or members of the net move to open position with a snap action and are retained in such position under tension which preferably is provided by a structural part of the net itself.

A still further object is to provide a folding or collapsible landing net having means for positively maintaining the net in open condition and which means is simple and can be readily released by the hand holding the net when it is desired to fold or collapse the net.

A further object is to provide a collapsible or folding landing net of the type hereinbefore specified and which is simple in construction, is sturdy, can be readily and economically manufactured and when folded or collapsed will be compact and will occupy a minimum space for purposes of transportation or packing.

Further and additional objects and advantages not hereinbefore specified will become apparent hereinafter during the detailed description of an embodiment of the invention which is to follow and which embodiment is illustrated in the accompanying drawing, wherein Fig. 1 is a perspective view of a net embodying the invention and in open or operative condition, said view illustrating by dot and dash lines the relationship between the bowed portions of the two main frame members of the net prior to the interconnection of the ends of said frame members by the web which extends therebetween at the front end of the net.

Fig. 2 is a fragmentary side elevational view of the net when the main frame members thereof have been folded against each other in collapsing the net, while the net proper is still in extended or depending condition with respect to said frame members.

Fig. 3 is a top plan view of the net when fully collapsed or folded, i. e., when the two frame members have been swung into contact with each other as shown in Fig. 2 and when the net proper has been wrapped around said frame members.

Fig. 4 is a fragmentary top view illustrating the outer end of one of the main frame members, a portion of the net proper and a portion of the web which is connected to and extends between the outer ends of the main frame members.

Fig. 5 is a view taken approximately along line 5—5 of Fig. 4 looking in the direction of the arrows.

Fig. 6 is a sectional view taken along line 6—6 of Fig. 4 looking in the direction of the arrows.

Fig. 7 is a sectional view through the main frame members of the net when the net is in open position and is taken substantially along line 7—7 of Fig. 1 looking in the direction of the arrows.

Fig. 8 is a view similar to Fig. 7 but showing the main frame members in collapsed or folded condition.

Figure 9 is a transverse sectional view through the main frame members of the net when in open or operative condition and illustrating the positive means for maintaining said frame members in such condition, said view being taken substantially on line 9—9 of Figs 1 and 10 looking in the direction of the arrows, and Fig. 10 is a fragmentary bottom plan view of the main frame members when in open or operative condition and showing the means for positively maintaining said members in such condition.

The net embodying the invention comprises two main frame members 15 and 16. These members may be formed of any suitable material having a degree of resilience and preferably possessing buoyancy as, for example, the main frame members may be formed of wood, plastic or any other suitable material. For purposes of illustration the main frame members 15 and 16 are shown as formed of wood and each included a handle portion 17 and a bowed portion 18.

The main frame members 15 and 16 are hingedly connected together at the handle portions 17 by means of suitable hinges, such as piano hinges 19, secured to the handle portions, wherefore the frame members can be swung from open or operative position as indicated in Fig. 7 to collapsed or inoperative position as indicated in Fig. 8. When the frame members are in the inoperative or collapsed position of Fig. 8 the hinges 19 are on the bottom side of the frame members and when said frame members are swung to open or operative position as indicated in Fig. 7 it will be noted that the pivotal axis of the hinges extends slightly above the plane of the upper surface of the frame members. The outer ends of the frame members are interconnected by a web W which places the frame members under tension and moves the portions 18 of the frame members from the dot-dash line position of Fig. 1 into the full line position thereof. The term "web" as used in the specification and claims is intended to mean a strip, ribbon, cord or other elongated relatively narrow piece of material.

The web W exerts its tensioned pull on the frame members slightly below the plane in which the pivotal axis of the hinges 19 is located, wherefore in manipulating the frame members from closed or inoperative position to the open position of Fig. 1 the web W exerts a spring pull on the frame members to cause the final part of the movement of said members to open position to be in the nature of a snap action. In addition the web W exerts a constant action or pull on the frame members during the use of the net tending to maintain said members in open or operative position. The web W and the manner in which it is secured to the frame members will be described in greater detail hereinafter.

In addition to maintaining the frame members in open or operative position during use by the tension of the web W it is proposed to positively maintain the frame members in such position by latch means which can be readily manipulated by the user's hand which holds the net and which latch means is illustrated in Figs. 9 and 10. The latch means is secured to the sides 20 of the handle portions 17 of the frame members. This latch means may take any suitable or desirable form but for illustrative purposes is shown as comprising a plate 21 secured to the side 20 of the handle portion 17 of the frame member 15 by a suitable screw and preferably flush with the surface of the side 20. The plate 21 extends outwardly over a chamfered notch 22 formed at the edge of the side 20 and said plate at its end has an inwardly extending hook portion 23 located slightly beyond the plane of the upper side of the handle portions when the latter are in collapsed position. The side 20 of the handle portion 17 of the frame member 16 has secured to it by a suitable screw a plate 24 which extends over and angularly inward of a notch 25 formed in the edge of the handle portion of the frame member 16 and cooperating when said members are in open or operative position with the notch 22. The inwardly extending or angular portion of the plate 24 is provided at its outer end with an outwardly extending hook 26. The inwardly extending or angular portion of the plate 24 constitutes a spring portion which can be pressed inwardly of the notch 25.

When the frame members are moved from the position of Fig. 8, i. e., the inoperative position to their open or operative position as shown in Figs. 1, 7, 9 and 10 the hooks 23 and 26 of the plates 21 and 24 will interlock as indicated in Figs. 9 and 10 and will act to positively maintain the frame members in open or operative position. When the user of the net desires to collapse the net he merely depresses the angular spring portion of the plate 24 into the notch 25 by the thumb of his hand which is holding the net and thereby disengages the hooks 23 and 26, whereupon he can by manipulation of said hand move the frame members about the axis of the hinges from open to collapsed position.

The portions 18 of the frame members are provided with a series of longitudinally spaced openings through which can pass the loops 27 of the cords 28 forming the net proper 29. The loops 27 extend around a holding cord 30 which runs longitudinally of the frame members and has its opposite ends passing through the end openings of said series of openings and knotted as indicated at 30a to maintain the cord 30 in position. This arrangement provides a simple and secure way of attaching the net proper 29 to the portions 18 of the frame members.

The web W may be formed of any suitable material and attached to the outer ends of the bowed portions 18 of the main frame member in any desirable way. However, a preferred construction is illustrated herein and will now be described. The outer end of each portion 18 of the frame members is provided with a longitudinally extending slot 31 into which the end of the web W extends and is secured by means of suitable rivets or other securing means 32 extending through the frame members.

It will be noted by reference to Fig. 4 that the outer end of each frame member adjacent the inner side of the slot 31 underlies the outer end of the member which is adjacent the outer side of the slot, wherefore the web W lies within the outer end of the frame member and is protected by that portion of the frame member which extends beyond the plane of the web W. This arrangement is advantageous in that the web is protected during the use of the net, particularly at the point where it is bent into the slot 31, against blows which might tend to rupture or shear the web.

The web W is formed preferably but not necessarily of a strip of plastic material 33 folded or doubled upon itself. The cords 28 of the net have their loops 27 extending between the folds of the strip and the strip is then stitched lengthwise as indicated at the lines 34 to secure the loops in the strip. This arrangement provides a secure attachment of the loops 27 to the web W and since said web preferably is formed of transparent plastic material it is invisible to a fish being landed by the net. The ordinary landing net wherein the frame members extend completely around the entrance to the net presents a visible portion over which the fish must pass in entering the net and frequently the fish seeing such visible portion makes one last determined effort to escape with the not uncommon result that the fisherman may lose the fish during the landing operation.

It will be seen that when the net is collapsed the net proper can be wrapped around the main frame members as indicated in Fig. 3 and when so wrapped the collapsed net is compact and may be readily stored in the fisherman's luggage or carried from place to place.

The net is provided with the usual elastic loop 35 by which the fisherman suspends the net from his shoulders and assuming that the net is in the condition of Fig. 3 and the fisherman wishes to open the net for use it is merely necessary for him with one hand to unwrap the net proper by moving the frame members in a rotary motion and then to snap the frame members from collapsed to open position by a single hand manipulation.

Although a preferred embodiment of the invention has been illustrated and described herein it will be understood that the invention is susceptible of various modifications and adaptations within the scope of the appended claims.

Having thus described my invention, I claim:

1. A landing net comprising a pair of main frame members each having a handle portion and a bowed portion, hinge means pivotally connecting said members together at the handle portions with the axis of the hinge means extending longitudinally of the handle portions and with said means including cooperating hinge elements secured respectively to said handle portions whereby said members may be folded against each other or opened to have the handle portions thereof in transverse alignment and said bowed portions in spaced relation, a net proper, and means carried by the frame members for securing the net proper thereto and for supporting the net between the ends of the bowed portions of the frame members when said members are opened.

2. A landing net as defined in claim 1 and wherein the handle portion and bowed portion of each frame member are integral with each other.

3. A landing net as defined in claim 1 and wherein the hinge means comprises separate hinges secured to the handle portions of said members in longitudinally spaced relationship with respect to said portions.

4. A landing net as defined in claim 1 and wherein the means carried by the frame members for securing the net thereto includes a flexible web extending between the outer ends of the bowed portions of the frame members and acting when the frame members are opened to support the net between the ends of the bowed portions of the frame members.

5. A landing net as defined in claim 1 and wherein the location of the hinge means on the handle portions is such that when the frame members are opened the pivotal axis of the hinge means is located adjacent to the plane of one side of the transversely aligned handle portions and wherein the means for securing the net to the frame members includes a flexible web extending between the ends of the bowed portions of the frame members and so located and attached to the frame members as to exert a tensioned pull thereon offset with respect to the plane of the pivotal axis of the hinge means, wherefore said web causes said frame members to move to fully opened position with a snap action and functions to maintain the frame members in open position.

6. A landing net as defined in claim 1 and wherein said handle portions of said frame members are provided with cooperating latch means acting when said members are opened to positively maintain said members in opened position.

7. A landing net as defined in claim 1 and wherein the means carried by the frame members for securing the net proper thereto includes a transparent web extending between and secured to the free ends of the bowed portions of the frame members.

HARRY F. BALOUN.

REFERENCES CITED

The following references are of record in the file of this patent:

UNITED STATES PATENTS

| Number | Name | Date |
|---|---|---|
| 737,428 | Lindsey et al. | Aug. 25, 1903 |
| 959,555 | Korberstein | May 31, 1910 |
| 1,218,619 | Bennett | Mar. 13, 1917 |
| 1,528,311 | Surridge | Mar. 3, 1925 |
| 1,942,252 | Martin | Jan. 2, 1934 |
| 2,205,706 | Wolff | June 25, 1940 |
| 2,457,922 | Robinson | Jan. 4, 1949 |

FOREIGN PATENTS

| Number | Country | Date |
|---|---|---|
| 16,577 | Great Britain | 1888 |